(12) United States Patent
Dong et al.

(10) Patent No.: US 10,902,980 B1
(45) Date of Patent: Jan. 26, 2021

(54) OVER-CURRENT PROTECTION DEVICE

(71) Applicant: Polytronics Technology Corp., Hsinchu (TW)

(72) Inventors: Zhen-Yu Dong, Tainan (TW); Yung-Hsien Chang, Douliu (TW); Hsiu-Che Yen, Taoyuan (TW); Yao-Te Chang, Linnei Township, Yunlin County (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 16/844,583

(22) Filed: Apr. 9, 2020

(30) Foreign Application Priority Data

Dec. 20, 2019 (TW) .............................. 108146973 A

(51) Int. Cl.
| | |
|---|---|
| *H01C 1/14* | (2006.01) |
| *H02H 9/02* | (2006.01) |
| *H01C 7/02* | (2006.01) |

(52) U.S. Cl.
CPC ........... *H01C 1/1406* (2013.01); *H01C 7/021* (2013.01); *H01C 7/027* (2013.01); *H02H 9/026* (2013.01)

(58) Field of Classification Search
CPC ...... H01C 1/1406; H01C 7/021; H01C 7/027; H02H 9/026; H02H 3/025; G05F 1/573
See application file for complete search history.

(56) References Cited

U.S. PATENT DOCUMENTS

| | | | |
|---|---|---|---|
| 2002/0109576 A1* | 8/2002 | Wang ............... | H01C 17/06586 338/22 R |
| 2007/0187655 A1* | 8/2007 | Wang ...................... | H01B 1/22 252/511 |
| 2010/0134942 A1* | 6/2010 | Wang ..................... | H01C 7/021 361/93.7 |
| 2011/0156859 A1* | 6/2011 | Sha ........................ | H01C 7/027 338/22 R |
| 2011/0241818 A1* | 10/2011 | Sha ........................ | H01C 7/027 338/22 R |
| 2012/0182118 A1* | 7/2012 | Tsai ........................ | H01C 7/13 338/22 R |
| 2015/0155080 A1* | 6/2015 | Chu ........................ | H01C 7/027 338/22 R |
| 2016/0233667 A1* | 8/2016 | Chen ..................... | H01C 7/028 |

FOREIGN PATENT DOCUMENTS

| | | |
|---|---|---|
| TW | 201604901 A | 2/2016 |
| TW | 201640527 A | 11/2016 |

* cited by examiner

*Primary Examiner* — Kyung S Lee
(74) *Attorney, Agent, or Firm* — Muncy, Geissler, Olds & Lowe, P.C.

(57) ABSTRACT

An over-current protection device comprises first and second electrode layers and a PTC material layer laminated therebetween. The PTC material layer comprises a polymer, an electrically conductive filler and a metal compound filler. The PTC material layer comprises the polymer of 50-70% by volume, and the electrically conductive filler and the metal compound filler are distributed in the polymer. The metal compound filler has a particle size D50 of 2-15 μm and 5-20% by volume and is selected from the group consisting of aluminum nitride, aluminum hydroxide, aluminum oxide, titanium oxide and zirconium oxide. The over-current protection device has a resistivity of 0.7-1.2 Ω·cm.

8 Claims, 1 Drawing Sheet

OVER-CURRENT PROTECTION DEVICE

BACKGROUND OF THE INVENTION

(1) Field of the Invention

The present application relates to an over-current protection device, and more specifically, to an over-current protection device with a superior high-temperature resistance stability.

(2) Description of the Related Art

Because the resistance of conductive composite materials having a positive temperature coefficient (PTC) characteristic is very sensitive to temperature variation, it can be used as the material for current sensing devices and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4 \Omega$), which is the so-called trip. Therefore, the over-current will be eliminated so as to protect the cell or the circuit device.

The PTC conductive composite material usually comprises polymer and a conductive filler dispersed in the polymer. The polymer may use high density polyethylene (HDPE), and the conductive filler may use carbon black. For the sake of thermal conductivity and flame retardance, the PTC conductive composite material may further comprise magnesium hydroxide ($Mg(OH)_2$) and boron nitride (BN). Traditionally, the PTC conductive composite material has the problems of high resistance and large resistance increase at a high temperature. The problems are obvious for small devices such as a form factor of 0402, 0201, and therefore need to be resolved.

SUMMARY OF THE INVENTION

The present application provides an over-current protection device with a view to decreasing the resistivity thereof by introducing specific metal compound fillers. Moreover, the resistance increment of the over-current protection device at a high temperature, e.g., 175° C., can be limited to obtain a good resistance stability. As a result, the over-current protection device can withstand high-temperature processes during manufacturing without significant resistance increase.

In accordance with an embodiment of the present application, an over-current protection device comprises first and second electrode layers and a PTC material layer laminated therebetween. The PTC material layer comprises a polymer, an electrically conductive filler and a metal compound filler. The PTC material layer comprises the polymer of 50-70% by volume, and the electrically conductive filler and the metal compound filler are distributed in the polymer. The metal compound filler has a particle size D50 of 2-15 μm and comprises 5-20% by volume, and is selected from the group consisting of aluminum nitride (AN), aluminum hydroxide ($Al(OH)_3$), aluminum oxide ($Al_2O_3$), titanium oxide ($TiO_2$) and zirconium oxide ($ZrO_2$). The over-current protection device has a resistivity of 0.7-1.2 Ω·cm.

In an embodiment, the over-current protection device has a resistivity of 2.5-7 Ω·cm after being heated at a temperature of 175° C. for 4 hours.

In an embodiment, the over-current protection device has a resistivity of 4-10 Ω·cm after being heated at a temperature of 175° C. for 10 hours. In an embodiment, the metal compound filler is of a spherical or random structure.

In an embodiment, the electrically conductive filler is selected from the group consisting of carbon black, tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

In an embodiment, the polymer comprises high-density polyethylene (HDPE), medium-density polyethylene, low-density polyethylene (LDPE), polyvinyl wax, vinyl polymer, polypropylene, polyvinyl chloride, copolymer of ethylene and acrylic acid, copolymer of ethylene and acrylic resin, or copolymer of ethylene and vinyl alcohol.

By using specific metal compound filler in place of the traditional thermally conductive and flame-retardant filler in the PTC material layer, the over-current protection device can lower the resistance and sustain a low resistivity at a high temperature. Therefore, the over-current protection device can be manufactured by high-temperature processes. Because the over-current protection device performs PTC behavior, it can provide over-temperature protection as well.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed below in detail. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Table 1 shows the composition to make a PTC material layer by volume percentages in accordance with Embodiments (E1-E9) of the present application and Comparative Examples (C1-C4) in which the polymer uses high-density polyethylene (HDPE) which is TAISOX HDPE-8010 of Formosa Plastics, Inc. and the carbon black (CB) serving as a conductive filler dispersed in the polymer uses RAVEN 430 ULTRA of Columbian Chemical Company. The PTC material layer comprises the polymer of 50-70%, e.g., 55%, 60% or 65%, by volume and the carbon black of 20-45%, e.g., 25%, 30% or 40%, by volume. In E1-E9, a metal compound filler is further dispersed in the polymer and is usually thermally conductive. The metal compound filler comprises $Al(OH)_3$, $Al_2O_3$, AlN, $TiO_2$ and $ZrO_2$ with a particle size D50 of 2-15 μm, e.g., 3 μm, 6 μm or 12 μm and 5-20%, e.g., 7%, 10% or 15% by volume of the PTC material layer. D50 is known as the median diameter or the medium value of the particle size distribution. The metal compound filler is of a spherical or random structure. The spherical structure comprises a sphere-like structure and the random structure comprises a debris structure. E7 has a metal compound filler of a random structure and other embodiments are of a spherical structure. C1 and C2 use a traditional flame retardant $Mg(OH)_2$ of a spherical structure. C3 uses BN of a flake structure. C4 uses $Al(OH)_3$ of a spherical structure with a particle size D50 of 1 μm, which is smaller than the particle sizes of E1 and E2.

TABLE 1

| | | | (vol %) | | | | | | | | |
|---|---|---|---|---|---|---|---|---|---|---|---|
| | HDPE | CB | $Mg(OH)_2$ 5 μm | BN 2.7 μm | $Al(OH)_3$ 1 μm | $Al(OH)_3$ 2 μm | $Al(OH)_3$ 8 μm | $Al_2O_3$ 5 μm | $Al_2O_3$ 15 μm | AlN 5 μm | $TiO_2$ 2.5 μm | $ZrO_2$ 2.5 μm |
| E1 | 57 | 32 | — | — | — | 11 | — | — | — | — | — | — |
| E2 | 57 | 32 | — | — | — | — | 11 | — | — | — | — | — |
| E3 | 57 | 32 | — | — | — | — | — | 11 | — | — | — | — |
| E4 | 57 | 32 | — | — | — | — | — | — | 11 | — | — | — |
| E5 | 51 | 32 | — | — | — | — | — | 17 | — | — | — | — |
| E6 | 57 | 32 | — | — | — | — | — | — | — | 11 | — | — |
| E7 | 57 | 32 | — | — | — | — | — | — | 11 | — | — | — |
| E8 | 60 | 32 | — | — | — | — | — | — | — | — | 8 | — |
| E9 | 60 | 32 | — | — | — | — | — | — | — | — | — | 8 |
| C1 | 57 | 32 | 11 | — | — | — | — | — | — | — | — | — |
| C2 | 57 | 26 | 17 | — | — | — | — | — | — | — | — | — |
| C3 | 57 | 26 | — | 17 | — | — | — | — | — | — | — | — |
| C4 | 57 | 32 | — | — | 11 | — | — | — | — | — | — | — |

Figure 1:
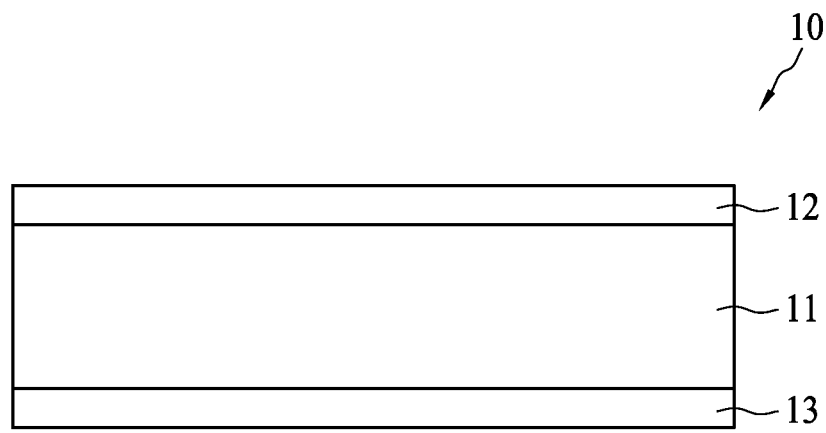
FIG. 1 shows an over-current protection device in accordance with an embodiment of the present application.
Figure 2:
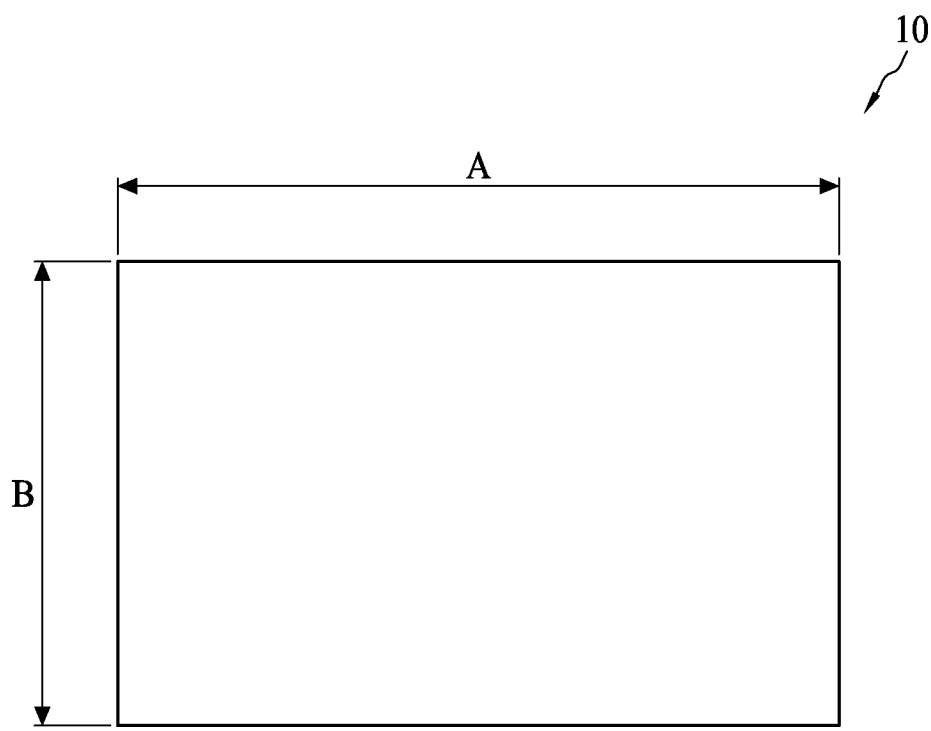
FIG. 2 shows the top view of the over-current protection device shown in FIG. 1.

The materials of E1-E9 and C1-C4 are put into HAAKE twin screw blender with the volume percentages as shown above for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm². The sheet is then cut into pieces of about 20 cm×20 cm, and two nickel-plated copper foils are laminated to two sides of the sheet with the hot press machine at a temperature of 210° C. and a pressure of 150 kg/cm². Then, the sheet with the nickel-plated copper foils is punched into PTC chips. FIG. 1 shows one of the PTC chips which is an over-current protection device 10 of the present invention. FIG. 2 is a top view of the over-current protection device 10 in FIG. 1. The over-current protection device 10 comprises a PTC material layer 11 formed by the conductive polymer, and a first electrode layer 12 and a second electrode layer 13 formed by the nickel-plated copper foils. The PTC material layer 11 has a thickness of about 0.28-0.77 mm. The area "A×B" of the over-current protection device 10 is equivalent to the area of the PTC material layer 11. Each of the devices E1-E9 and C1-C4 has a length "A" of 2 mm and a width "B" of 2 mm, and thus the area is 4 mm². The PTC material layer 11 has a thickness of 0.3 mm.

In an embodiment, a solder paste is daubed on the outer surfaces of the first and second electrode layers 12 and 13, and two copper electrodes with a thickness of 0.5 mm are respectively disposed on the solder paste on the first and second electrode layers 12 and 13 as external leads, and then the assembled device is subjected to a reflow soldering process at 300° C. so as to form a PTC device of an axial-type or a radial-leaded type. Alternatively, notches may be made on the first and second electrode layers by etching and followed by making insulating layers, outer electrode layers and conductive connecting holes to form a PTC device of surface-mountable device (SMD) type. Making SMD may need high-temperature molding, the PTC material of the present application can mitigate resistance increase during high-temperature processes. The over-current protection device of the present application comprises various structures, including but not limited to that shown in FIG. 1 and FIG. 2. Others including the PTC chip are covered by the scope of the present application also.

The PTC chips are subjected to electron beam irradiation of 50 kGy. The dose of irradiation can be adjusted as desired and is not a limitation to the present application. The following resistances of the PTC chips are measured after irradiation: (1) initial resistance, Ri; (2) the resistance after trip once, R1 max; (3) the resistance after heating at 175° C. for 4 hours, R_175° C./4 hr; and (4) the resistance after heating at 175° C. for 10 hours, R_175° C./10 hr. Based on the four resistance values (R), and the thickness (L) and area (A) of the PTC material layer, corresponding resistivities ρ, ρ_R1 max, ρ_175° C./4 hr and ρ_175° C./10 hr can be calculated in accordance with resistance formula R=ρ×L/A. These values are shown in Table 2. C2, C3 and C4 do not measure R_175° C./10 hr. Heating the PTC chips for 4 hours and 10 hours at 175° C. is to test high-temperature stability. High-temperature processes may be employed in manufacturing, such as molding.

TABLE 2

| | Ri (Ω) | ρ (Ω·cm) | R1 max (Ω) | ρ_R1 max (Ω·cm) | R_175° C./4 hr (Ω) | ρ_175° C./4 hr (Ω·cm) | R_175° C./10 hr (Ω) | ρ_175° C./10 hr (Ω·cm) |
|---|---|---|---|---|---|---|---|---|
| E1 | 0.864 | 1.15 | 1.523 | 2.03 | 4.27 | 5.69 | 6.90 | 9.20 |
| E2 | 0.709 | 0.95 | 3.508 | 4.68 | 4.70 | 6.27 | 5.82 | 7.76 |
| E3 | 0.593 | 0.79 | 1.011 | 1.35 | 2.19 | 2.92 | 3.66 | 4.88 |
| E4 | 0.637 | 0.85 | 1.091 | 1.45 | 2.56 | 3.41 | 4.01 | 5.35 |
| E5 | 0.535 | 0.71 | 0.912 | 1.22 | 2.02 | 2.69 | 3.02 | 4.03 |
| E6 | 0.643 | 0.86 | 1.132 | 1.51 | 3.28 | 4.37 | 5.25 | 7.00 |
| E7 | 0.587 | 0.78 | 1.019 | 1.36 | 2.98 | 3.97 | 4.45 | 5.93 |
| E8 | 0.669 | 0.89 | 0.816 | 1.09 | 2.24 | 2.99 | 4.03 | 5.37 |
| E9 | 0.661 | 0.88 | 0.808 | 1.15 | 2.08 | 2.77 | 3.30 | 4.40 |

TABLE 2-continued

|    | Ri (Ω) | ρ (Ω·cm) | R1 max (Ω) | ρ_R1 max (Ω·cm) | R_175° C./4 hr (Ω) | ρ_175° C./4 hr (Ω·cm) | R_175° C./10 hr (Ω) | ρ_175° C./10 hr (Ω·cm) |
|----|--------|----------|------------|-----------------|--------------------|-----------------------|---------------------|------------------------|
| C1 | 0.94   | 1.25     | 1.87       | 2.49            | 5.58               | 7.44                  | 8.93                | 11.91                  |
| C2 | 1.49   | 1.99     | 2.5        | 3.33            | 10.10              | 13.47                 | —                   | —                      |
| C3 | 2.646  | 3.53     | 17.905     | 23.87           | 57.30              | 76.40                 | —                   | —                      |
| C4 | 1.432  | 1.91     | 2.269      | 3.03            | 13.45              | 17.93                 | —                   | —                      |

In Table 2, E1-E9 have resistivities of 0.7-1.2 Ω·cm corresponding to the initial resistances Ri, and the resistivities are less than those of C1-C4. The resistivities ρ_175° C./4 hr of E1-E9 are 2.5-7 Ω·cm and ρ_175° C./10 hr of E1-E9 are 4-10 Ω·cm, which are much less than those of comparative examples. It appears that the metal compound filler provides superior resistance stability which is hard to be achieved by traditional flame retardant used in the comparative examples.

The metal compound filler comprises metal oxide, metal hydroxide and metal nitride of spherical and random structures. For example, the metal compound filler may include TiO$_2$, ZrO$_2$, AlN, Al(OH)$_3$ and Al$_2$O$_3$, and the particle size D50 is 2-15 μm. The resistance stability varies with different particle sizes. Comparing E3 with C1, the initial resistances of the PTC chips are 0.593Ω and 0.94Ω, respectively. That is, the resistance of E3 decreases by 36.9% in the case that traditional filler Mg(OH)$_2$ is replaced by Al$_2$O$_3$ of 5 μm. The resistances R_175° C./4 hr of E3 and C1 are 2.19Ω and 5.58Ω, respectively, i.e., the resistance of E3 decreases by 60.7% compared to C1. The resistances R_175° C./10 hr of E3 and C1 are 3.66Ω and 8.93Ω, respectively, i.e., the resistance of E3 decreases by 60.1%. The resistance vs. temperature diagram (R-T diagram) shows that the resistances of E3 at 130° C. and 180° C. are 553 and 9300, respectively and the resistances of C1 are 8643 and 32101Ω, respectively. It shows E3 has lower resistances also. Both E5 and E3 use Al$_2$O$_3$, and E5 has a greater volume percent of Al$_2$O$_3$. The resistances of E5 and C1 are 0.5350 and 0.940, and the resistance of E5 decreases by 43.1% compared to C1. This amount of resistance decrease of E5 is greater than that of E3. The resistances R_175° C./4 hr of E5 and C1 are 2.020 and 5.580, and the amount of resistance reduction is 63.8%. The resistances R_175° C./10 hr of E5 and C1 are 3.020 and 8.930, and the amount of resistance reduction is 66.2%. The resistances of E5 at 130° C. and 180° C. are 397f and 6020, respectively, and they are much lower than the corresponding resistances of C1. It appears that E5 having a greater amount of Al$_2$O$_3$ can obtain better resistance stability at a high temperature. E4 uses Al$_2$O$_3$ of a greater particle size D50 of 15 μm than E3, and E4 has a greater resistance than E3. It appears that the resistance varies with the particle size. E1, E2 and C4 use Al(OH)$_3$ of 2 μm, 8 μm and 1 μm, respectively. C4 has a greater resistance than E1 and E2. Compared to C1-C3 using traditional Mg(OH)$_2$ and BN, E6 using AlN, E7 using Al$_2$O$_3$ of a random or debris structure, E8 using TiO$_2$ and E9 using ZrO$_2$ can reduce the resistance effectively.

The polymer of the PTC material layer 11 may use crystalline polyolefines (e.g., high-density polyethylene (HDPE), medium-density polyethylene, low-density polyethylene (LDPE), polyvinyl wax, vinyl polymer, polypropylene, polyvinyl chloride and polyvinyl fluoride), copolymer of olefin monomer and acrylic monomer (e.g., copolymer of ethylene and acrylic acid or copolymer of ethylene and acrylic resin) or copolymer of olefin monomer and vinyl alcohol monomer (e.g., copolymer of ethylene and vinyl alcohol), and may include one or more crystalline polymer materials. The LDPE can be polymerized using Ziegler-Natta catalyst, Metallocene catalyst or the like, or can be copolymerized by vinyl monomer and other monomers such as butane, hexane, octane, acrylic acid, or vinyl acetate.

In addition to carbon black, the electrically conductive filler of the PTC material layer 11 may use electrically conductive ceramic filler. The electrically conductive ceramic filler comprises metal carbide, metal boride and metal nitride such as titanium carbide (TiC), tungsten carbide (WC), vanadium carbide (VC), zirconium carbide (ZrC), niobium carbide (NbC), tantalum carbide (TaC), molybdenum carbide (MoC), hafnium carbide (HfC), titanium boride (TiB$_2$), vanadium boride (VB$_2$), zirconium boride (ZrB$_2$), niobium boride (NbB$_2$), molybdenum boride (MoB$_2$), hafnium boride (HfB$_2$), or zirconium nitride (ZrN). Moreover, the electrically conductive filler may be the mixture, alloy, solid solution or core-shell of the aforesaid ceramic fillers.

By introducing specific metal compound filler such as TiO$_2$, ZrO$_2$, AlN, Al(OH)$_3$, Al$_2$O$_3$ or combination thereof in the PTC material layer of the over-current protection device, the resistance can be kept low at a high temperature. In view of the feature of superior resistance stability, the over-current protection device of the present application can undergo high-temperature manufacturing processes without significant resistance increase.

The above-described embodiments of the present invention are intended to be illustrative only. Numerous alternative embodiments may be devised by persons skilled in the art without departing from the scope of the following claims.

What is claimed is:

1. An over-current protection device, comprising:
    a first electrode layer;
    a second electrode layer; and
    a PTC material layer laminated between the first and second electrode layers, the PTC material layer comprising:
        a polymer of 50-70% by volume;
        an electrically conductive filler dispersed in the polymer; and
        a metal compound filler dispersed in the polymer, the metal compound filler having a particle size D50 of 2-15 μm and 5-20% by volume and being selected from the group consisting of aluminum nitride, aluminum hydroxide, aluminum oxide, titanium oxide and zirconium oxide; wherein the over-current protection device has a resistivity of 0.7-1.2 Ω·cm;
    wherein the over-current protection device has a resistivity of 2.5-7 Ω·cm after being heated at a temperature of 175° C. for 4 hours.

2. The over-current protection device of claim 1, wherein the metal compound filler is of a spherical or random structure.

3. The over-current protection device of claim 1, wherein the electrically conductive filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

4. The over-current protection device of claim 1, wherein the polymer comprises high-density polyethylene, medium-density polyethylene, low-density polyethylene, polyvinyl wax, vinyl polymer, polypropylene, polyvinyl chlorine, copolymer of ethylene and acrylic acid, copolymer of ethylene and acrylic resin, or copolymer of ethylene and vinyl alcohol or combination thereof.

5. An over-current protection, comprising:
- a first electrode layer;
- a second electrode layer; and
- a PTC material layer laminated between the first and second electrode layers, the PTC material layer comprising:
  - a polymer of 50-70% by volume:
  - an electrically conductive filler dispersed in the polymer; and
  - a metal compound filler dispersed in the polymer, the metal compound filler having a particle size D50 of 2-15 μm and 5-20% by volume and being selected from the group consisting of aluminum nitride, aluminum hydroxide, aluminum oxide, titanium oxide and zirconium oxide: wherein the over-current protection device has a resistivity of 0.7-1.2 Ω·cm:
  - wherein the over-current protection device has a resistivity of 4-10 Ω·cm after being heated at a temperature of 175° C. for 10 hours.

6. The over-current protection device of claim 5, wherein the metal compound filler is of a spherical or random structure.

7. The over-current protection device of claim 5, wherein the electrically conductive filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

8. The over-current protection device of claim 5, wherein the polymer comprises high-density polyethylene, medium-density polyethylene, low-density polyethylene, polyvinyl wax, vinyl polymer, polypropylene, polyvinyl chlorine, copolymer of ethylene and acrylic acid, copolymer of ethylene and acrylic resin, or copolymer of ethylene and vinyl alcohol or combination thereof.

\* \* \* \* \*